(12) United States Patent
Rohde et al.

(10) Patent No.: US 12,536,718 B2
(45) Date of Patent: Jan. 27, 2026

(54) STYLE-BASED DYNAMIC CONTENT GENERATION

(71) Applicant: salesforce.com, inc., San Francisco, CA (US)

(72) Inventors: Sönke Rohde, San Francisco, CA (US); Brian Brechbuhl, Columbus, IN (US); Jessica Lundin, Bellevue, WA (US); Douglas R G White, Indianapolis, IN (US); David Woodward, Bozeman, MT (US); Chris Dalzell, Indianapolis, IN (US); Brian Lonsdorf, San Francisco, CA (US); Alan Martin Ross, San Francisco, CA (US); Owen Winne Schoppe, Orinda, CA (US); Michael Sollami, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 44 days.

(21) Appl. No.: 17/525,916

(22) Filed: Nov. 14, 2021

(65) Prior Publication Data

US 2023/0154082 A1 May 18, 2023

(51) Int. Cl.
*G06T 11/60* (2006.01)
*G06F 18/214* (2023.01)
*G06T 7/11* (2017.01)
*G06V 10/22* (2022.01)
*G06V 20/62* (2022.01)
*G06V 30/14* (2022.01)

(52) U.S. Cl.
CPC ............ *G06T 11/60* (2013.01); *G06F 18/214* (2023.01); *G06T 7/11* (2017.01); *G06V 10/225* (2022.01); *G06V 20/62* (2022.01); *G06V 30/1448* (2022.01); *G06T 2207/20132* (2013.01); *G06T 2210/12* (2013.01)

(58) Field of Classification Search
CPC . G06T 11/60; G06T 7/11; G06T 2207/20132; G06T 2210/12; G06F 18/214; G06V 10/225; G06V 20/62; G06V 30/1448
See application file for complete search history.

(56) References Cited

U.S. PATENT DOCUMENTS

| | | | |
|---|---|---|---|
| 11,172,271 B1* | 11/2021 | Vartakavi | H04N 21/4856 |
| 2008/0313533 A1* | 12/2008 | Hoyer | G06F 40/103 |
| | | | 715/243 |
| 2012/0110438 A1* | 5/2012 | Peraza | G06F 40/109 |
| | | | 345/660 |
| 2014/0245115 A1* | 8/2014 | Zhang | G06F 40/103 |
| | | | 715/202 |
| 2021/0334528 A1* | 10/2021 | Bray | G06F 18/21 |
| 2022/0277136 A1* | 9/2022 | Shekhar | G06F 40/186 |

* cited by examiner

*Primary Examiner* — Said Broome
*Assistant Examiner* — Andrew Shin
(74) *Attorney, Agent, or Firm* — Butzel Long

(57) ABSTRACT

Systems, devices, and techniques are disclosed for style-based dynamic content generation. A seed image, entity design data, entity style data, and text items may be received. Bounding boxes that identify areas of the seed image for the placement of the text items may be generated for the seed image. Variant images may be generated from the seed image, the entity design data, and the entity style data. The variant images may be generated by placing text items in the bounding boxes based on the entity design data and rendering text of the text items using the entity style data.

20 Claims, 11 Drawing Sheets

STYLE-BASED DYNAMIC CONTENT GENERATION

BACKGROUND

Creating marketing content may be time consuming. A design team may generate images that are used for testing to find the best image placement, text, descriptions, button size, color, and placement for the marketing content. There may need to be a lot of communication between a marketing team and a design team, and designers may need time to make and build each of these images before they are tested. Customizing marketing content for individual consumers or groups of consumers may require additional effort. This may result in limits to how much marketing content, including customized content, can be created in any span of time.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
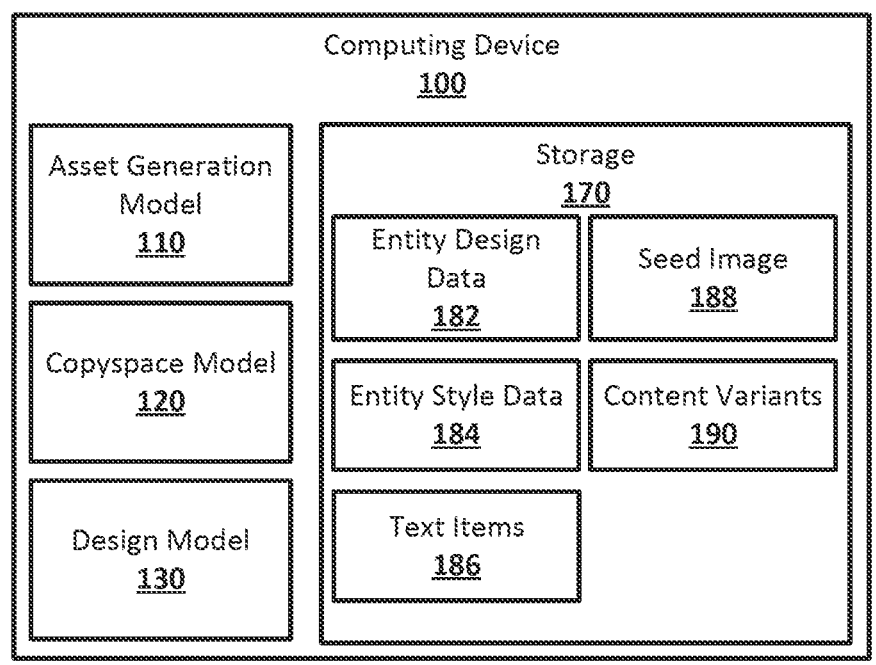
FIG. 1 shows an example system suitable for style-based dynamic content generation according to an implementation of the disclosed subject matter.

Techniques disclosed herein enable style-based dynamic content generation, which may allow for automatic and dynamic generation of content including content variants that incorporate a specified style. A seed image, entity style data, entity design data, and text items may be received. Bounding boxes that identify areas of the seed image for the placement of the one or more text items may be generated. Content variants may be generated from the seed image, the entity design data, and the entity style data by placing the text items into the bounding boxes based on the entity design data and rendering the text of the text items with the entity style data.

A seed image, entity style data, entity design data, and text items may be received. The seed image may be an image to be used for the dynamic generation of content, such as, for example, marketing content. For example, the seed image may be an image that depicts a product that will be marketed with the marketing content. The seed image may, for example, be an image that depicts people using or interacting with the product, the product on its own, multiple products, or imagery that may be associated with a product.

The entity style data may be data about the style used for content by a particular entity. An entity may be, for example, an individual, company, business, organization, or brand. The entity style data may include any suitable data, including, for example, font faces or type, font sizes, colors, spacings, and other design and typography style elements used by the entity. For example, a brand may use specific fonts and colors in its marketing content and may want these fonts and colors used in any dynamically generated content that the brand will use for marketing. The entity style data may have been gathered for an entity in any suitable manner. For example, the entity style data for an entity may be specified directly by the entity, or may be gathered from content already in use by the entity, such as, for example, through analysis of colors and fonts used on websites and marketing emails, and other marketing content already in use by a brand. The entity style data may also include iconography used by an entity, such as, for example, brand logos or other images used by the brand that may be recognizable as representing that brand.

The entity design data may be data about designs used for content by a particular entity. The entity design data may be data for the same entity as the entity style data. The entity design data may include any suitable data, including, for example, data on patterns used by the entity in content, such as how text is positioned, aligned, and shaped, specific aspects of the entity's style used for text in different positions, and positioning of elements of content including iconography and user interface elements such as buttons. For example, the entity style data for a brand may indicate how the brand generally positions related text and user interface buttons relative to each other in their marketing content. The entity design data may be gathered in any suitable manner, including, for example, being input directly, or being collected through extraction from already existing content for the entity, for example, crawling webpages for a brand. The entity design data may include statistics on repeating patterns, shapes of content, and placement of content. The entity design data may be represented as, for example, a tree structure that may represent design patterns for an entity in a hierarchical manner, or as lists.

The text items may be items of text that may be related to the content being generated in any suitable manner. For example, if the content being generated is for marketing a product, that text items may relate to the product, and to the marketing of the product, including, for example, a text item that describes the product, a text item that is a slogan or sales pitch for the product, and a text item that may inform a viewer of the content how they can obtain the product, including, for example, text items for buttons or other interactive elements of the content, which may be part of a webpage or content viewed in a standalone application, that a viewer may use such as "view now", "add to cart", or "purchase now." The received text items may have been generated in any suitable manner. For example, the received text items may have been written by a person, for example, a copywriter, or may have been generated using any suitable natural language processing (NLP) or natural language generation (NLG) model, for example a text style transfer model, that may have been trained on text items related to the entity from whom the entity style data was gathered. For example, if the entity is a brand, the text items may be generated using an NLP or NLG model trained on previous marking copy written for the brand, resulting in the generated text items being written in the style of the brand.

The seed image may be used to generate seed image variants. The seed image variants may be generated using an asset generation model. The asset generation model may be any suitable model that may have been trained to generate cropped versions of an input image without cropping out objects of interest in the input image. The asset generation model may be, for example, a generative adversarial network (GAN) with a generator network trained to generate cropped version of an input image and a discriminator network trained to identify bad cropped images, for example, cropped images that have removed objects of interest from the input image. A GAN for an asset generation model may use as input, for example, a seed image and a random number. A seed image that depicts a product may be input to the asset generation model which may output any suitable number of seed image variants that are cropped versions of the seed image that still depict the product. For example, a seed image may be input to a GAN for an asset generation model multiple times, with multiple different random numbers, generating a candidate seed image variant for each random number used. Candidate seed image variants that are passed through by the discriminator network of the GAN may be output as seed image variants.

Bounding boxes that identify areas of the seed image for the placement of the one or more text items may be generated. For example, the seed image may be input to a copyspace model. The copyspace model may be any suitable model for detecting areas of an image that may be used for the placement of text items. For example, the copyspace model may be an object detection model that may detect objects in the seed image and may generate bounding boxes that bound areas where objects were not detected. The copyspace model may also be, for example, a GAN that may include a generator network trained to generate bounding boxes around areas of an image that do not include an object and a discriminator network trained to detect bounding boxes that have been generated to include areas of an image that include an object that should not be covered with a text item. The copyspace model may output a single set or multiple sets of bounding boxes for any image input to the copyspace model. If the copyspace model is a GAN, the GAN may output the image with bounding boxes superimposed on the image, and the coordinates for the bounding boxes may be determined through image processing of the output of the GAN. If seed image variants have been generated, the seed image variants may also be input to the copyspace model, which may generate sets of bounding boxes for each of the seed image variants.

The bounding boxes generated for the seed image may be adjusted to generate additional sets of bounding boxes. Each set of bounding boxes generated for the seed image by the copyspace model may have their sizes adjusted through moving their boundaries to the horizontal or vertical edges of the seed image, or snapped to a gridline indicating a significant division of the seed image, such as, for example, horizontal or vertical lines at halves, thirds, or quarters of the seed image. This may generate additional sets of bounding boxes for the seed image. Bounding boxes may also be added to existing sets of bounding images, for example, to cover an area between the boundary of a bounding box and a horizontal or vertical edge of the seed image or horizontal or vertical gridline at a significant division of the image. This may also generate additional sets of bounding boxes for the seed images. Similarly, additional sets of bounding boxes may be generated for any seed image variants for which the copyspace model generated bounding boxes. The additional sets of bounding boxes may be generated by a design model, which may be any suitable model, including, for example, heuristic model or a GAN, that may adjust the bounding boxes generated by the copyspace model for the seed image and any seed image variants.

Content variants may be generated from the seed image, the entity design data, and the entity style data by placing the text items into the bounding boxes based on the entity design data and rendering the text of the text items with the entity style data. The seed image and any seed image variants may each have any number of sets of bounding boxes generated by the design model. The design model may use the entity style data to determine how to place the text items into and arrange the text items within the bounding boxes of a set of bounding boxes for the seed image or a seed image variant. The design model may generate any number of different placements and arrangements of the text items within a set of bounding boxes for a seed image or seed image variant. The design model may use the entity style data to change the typography of the text items that have been placed in bounding boxes, including, for example, the font faces, font sizes, font colors, letter and word spacing, and any other suitable aspects of the text items, and to add iconography from the entity style data to the bounding boxes. The design model may generate any number of different applications of entity style data to the different arrangement and placements of the text items within the sets of bounding boxes for the seed image and seed image variants, generating content variants. Thus, any number of content variants may be generated from a seed image or seed image variant. The content variants generated from the same seed image or seed image variant may vary by having different sets of bounding boxes, different arrangements and placements of text items within the bounding boxes, and/or different applications of the entity style data to the text items. For example, two content variants generated from the seed image may use the same set of bounding boxes, but have different arrangement and placement of text items within those bounding boxes and/or a different application of the entity style data to the text items, while other content variants may have differing sets of bounding boxes.

The design model may be, for example, a heuristic model based on statistics gathered from examples of content from various entities. For example, the heuristic model may use statistics gathered from analysis of marketing content from any number of brands. The statistics gathered from analysis of marketing content may include, for example, absolute and relative locations at which text items are placed within the marketing content. The design model may also be, for example a GAN, a with a discriminator network that has been trained using content from entities, such as marketing content from various brands, to identify images that can serve as viable content for the entity, and a generator network trained to output content, such as content variants, based on input images, bounding boxes, entity design data, and entity style data. A GAN for a design model may also use random number inputs to the generator network in addition to other inputs to allow for variance in the content variants generated by the generator network. Only content variants output by the generator network of the GAN that the discriminator network of the GAN evaluates as being viable content for the entity whose style data, design data, and text items were used as input, for example, a viable example of marketing content for a brand, may be output from the GAN for the design model. The design model may be able to generate content variants for any number of different entities that may have different entity style data, different entity design data, and different text items. This may result in the design model generating distinct content variants for different entities even if the same seed image is used for all of the entities. The content variants output by the design model may be evaluated for use by the entity in any suitable manner.

The design model may measure the image spectra of the areas within bounding boxes. The design model may compare the image spectra from a bounding box to the colors used on any text items placed within the bounding box by the design model. If the design model determines based on the comparison that the color of the text is too close to the colors within the bounding box based on the image spectra of the area within the bounding box, the design model may adjust the area to make the text more readable, for example, applying a semi-transparent overlay to the area within the bounding box to adjust the image spectra of the area in a direction that results in more contrast with the text items.

FIG. 1 shows an example system for suitable for style-based dynamic content generation according to an implementation of the disclosed subject matter. A computing device 100 may be any suitable computing device, such as, for example, a computer 20 as described in FIG. 7, or component thereof, for implementing style-based dynamic content generation. The computing device 100 may include a asset generation model 110, a copyspace model 120, a design model 130, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The asset generation model 110 may be any suitable combination of hardware and software of the computing device 100 for generating seed image variants from a seed image. The asset generation model 110 may, for example, be any suitable machine learning model that may have been trained to generate cropped versions of an input image without cropping out objects of interest in the input image. The asset generation model 110 may be, for example, a GAN with a generator network trained to generate cropped version of an input image and a discriminator network trained to identify bad cropped images, for example, cropped images that have removed objects of interest from the input image. A GAN used to implement the asset generation model 110 may use as input, for example, a seed image and a random number, and may output any suitable number of seed image variants that are cropped versions of the seed image that still depict the product. For example, a seed image may be input to a GAN used to implement the asset generation model 110 multiple times, with multiple different random numbers, generating a candidate seed image variant for each random number used. Candidate seed image variants that are passed through by the discriminator network of the GAN may be output as seed image variants by the asset generation model 110.

The copyspace model 120 may be any suitable combination of hardware and software of the computing device 100 for generating sets of bounding boxes for an image. The copyspace model 120 may, for example, be any suitable machine learning model for detecting areas of an image that may be used for the placement of text items. For example, the copyspace model 120 may be an object detection model that may detect objects in the seed image and may generate bounding boxes that bound areas where objects were not detected. The copyspace model 120 may also be, for example, a GAN that may include a generator network trained to generate bounding boxes around areas of an image that do not include an object and a discriminator network trained to detect bounding boxes that have been generated to include areas of an image that include an object that should not be covered with a text item. The copyspace model 120 may output a single set or multiple sets of bounding boxes for any image input to the copyspace model 120. If seed image variants have been generated, for example, using the asset generation model 110, the seed image variants may also be input to the copyspace model 120, which may generate sets of bounding boxes for each of the seed image variants.

The design model 130 may be any suitable combination of hardware and software of the computing device 100 for adjusting bounding boxes, placing text items in bounding boxes, and applying style data to text items to generate content variants. The design model 130 may, for example, be any suitable machine learning model that may be trained to generate content variants from a seed image, bounding boxes, style data, design data, and text items. For example, the design model 130 may be a GAN, or may be a heuristic model. A heuristic model used to implement the design model 130 may be based on statistics gathered from examples of content from various entities. For example, the heuristic model may use statistics gathered from analysis of marketing content from any number of brands. The statistics gathered from analysis of marketing content may include, for example, absolute and relative locations at which text items are placed within the marketing content. A GAN used to implement the design model 130 may include a with a discriminator network that has been trained using content from entities, such as marketing content from various brands, to identify images that can serve as viable content for the entity, and a generator network trained to output content, such as content variants, based on input images, bounding boxes, entity design data, and entity style data. A GAN used to implement the design model 130 may also use random number inputs to the generator network in addition to other inputs to allow for variance in the content variants generated by the generator network. Only content variants output by the generator network of the GAN that the discriminator network of the GAN evaluates as being viable content for the entity whose style data, design data, and text items were used as input, for example, a viable example of marketing content for a brand, may be output from the GAN used to implement the design model 130. The design model 130 may be able to generate content variants for any number of different entities that may have different entity style data, different entity design data, and different text items. This may result in the design model generating distinct content variants for different entities even if the same seed image is used for all of the entities. The content variants output by the design model may be evaluated for use by the entity in any suitable manner.

The design model 130 may adjust the bounding boxes generated for an image, such as a seed image, to generate additional sets of bounding boxes for the image. For example, the design model 130 may adjust each set of bounding boxes generated for the seed image by adjusting the sizes of the bounding boxes through moving their boundaries to the horizontal or vertical edges of the seed image, or snapping the edges to a gridline indicating a significant division of the seed image, such as, for example, horizontal or vertical lines at halves, thirds, or quarters of the seed image. The design model 130 may also add bounding boxes to existing sets of bounding images, for example, to cover an area between the boundary of a bounding box and a horizontal or vertical edge of the seed image or horizontal or vertical gridline at a significant division of the image. This may also generate additional sets of bounding boxes for the seed images.

The design model 130 may generate content variants from a seed image, entity design data, and entity style data by placing text items into the bounding boxes based on the entity design data and rendering the text of the text items with the entity style data. The seed image and any seed image variants may each have any number of sets of bounding boxes generated by the copyspace model 120 and the design model 130. The design model 130 may use the entity style data to determine how to place the text items into and arrange the text items within the bounding boxes of a set of bounding boxes for the seed image or a seed image variant. The design model 130 may generate any number of different placements and arrangements of the text items within a set of bounding boxes for a seed image or seed image variant. The design model 130 may use the entity style data to change the typography of the text items that have been placed in bounding boxes, including, for example, the font faces, font sizes, font colors, letter and word spacing, and any other suitable aspects of the text items, and to add iconography from the entity style data to the bounding boxes. The design model 130 may generate any number of different applications of entity style data to the different arrangement and placements of the text items within the sets of bounding boxes for the seed image and seed image variants, generating content variants. Thus, any number of content variants may be generated from a seed image or seed image variant. The content variants generated from the same seed image or seed image variant may vary by having different sets of bounding boxes, different arrangements and placements of text items within the bounding boxes, and/or different applications of the entity style data to the text items. For example, two content variants generated from the seed image may use the same set of bounding boxes, but have different arrangement and placement of text items within those bounding boxes and/or a different application of the entity style data to the text items, while other content variants may have differing sets of bounding boxes.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store entity design data 182, entity style data 184, text items 186, seed images 188, and content variants 190.

The entity design data 182 may be data about designs used for content by a particular entity. The entity may be, for example, an individual, company, business, organization, or brand. The entity design data 182 may be data for the same entity as the entity style data. The entity design data 182 may include any suitable data, including, for example, data on patterns used by the entity in content, such as how text is positioned, aligned, and shaped, specific aspects of the entity's style used for text in different positions, and positioning of elements of content including iconography and user interface elements such as buttons. For example, the entity style data for a brand may indicate how the brand generally positions related text and user interface buttons relative to each other in their marketing content. The entity design data 182 may be gathered in any suitable manner, including, for example, being input directly, or being collected through extraction from already existing content for the entity, for example, crawling webpages for a brand. The entity design data 182 may include statistics on repeating patterns, shapes of content, and placement of content. The entity design data 182 may be represented as, for example, a tree structure that may represent design patterns for an entity in a hierarchical manner, or as lists.

The entity style data 184 may be data about the style used for content by the same particular entity as the entity design data 182. The entity style data 184 may include any suitable data, including, for example, font faces or type, font sizes, font style, font weight, colors, spacings, and other design and typography style elements used by the entity. For example, a brand may use specific fonts and colors in its marketing content and may want these fonts and colors used in any dynamically generated content that the brand will use for marketing. The entity style data 184 may have been gathered for an entity in any suitable manner. For example, the entity style data 184 for an entity may be specified directly by the entity, or may be gathered from content already in use by the entity, such as, for example, through analysis of colors and fonts used on web sites and marketing emails, and other marketing content already in use by a brand. The entity style data 184 may also include iconography used by an entity, such as, for example, brand logos or other images used by the brand that may be recognizable as representing that brand.

The text items 186 may be items of text that may be related to the content being generated in any suitable manner. For example, if the content being generated is for marketing a product, that text items 186 may relate to the product, and to the marketing of the product, including, for example, a text item that describes the product, a text item that is a slogan or sales pitch for the product, and a text item that may inform a viewer of the content how they can obtain the product, including, for example, text items 186 for buttons or other interactive elements of the content, which may be part of a webpage or content viewed in a standalone application, that a viewer may use such as "view now", "add to cart", or "purchase now." The text items 186 may have been generated in any suitable manner. For example, the text items 186 may have been written by a person, for example, a copywriter, or may have been generated using any suitable natural language processing (NLP) or natural language generation (NLG) model, for example a text style transfer model, that may have been trained on text items 186 related to the same entity from whom the entity design data 182 and entity style data 184 were gathered. For example, if the entity is a brand, the text items 186 may be generated using an NLP or NLG model trained on previous marking copy written for the brand, resulting in the generated text items 186 being written in the style of the brand.

The seed image 188 may be an image to be used for the dynamic generation of content, such as, for example, marketing content, for the entity from which the entity design data 182 and entity style data 184 was gathered. The seed image 188 may include a depiction of any number of objects. Any suitable object or objects may be depicted in the seed image 188. For example, the seed image 188 may be an image that depicts a product that will be marketed with the marketing content. The seed image 188 may, for example, be an image that depicts people using or interacting with the product, the product on its own, multiple products, or imagery that may be associated with a product. The seed image 188 may also depict an object or objects that are not directly or indirectly related to any product that may be marketed with generated content.

The content variants 190 may be content dynamically generated by the design model 130 based on the seed image 188, the entity design data 182, the entity style data 184, the text items 186, seed image variants generated from the seed image 188 using the asset model 110, and sets of bounding boxes generated for the seed image 188 and any seed image variants using the copyspace model 120. The content variants may be any number of images that include text items from the text items 186 arranged and placed on the seed image 188 or a seed image variant according to the entity design data 182 with the text rendered using the entity style data 184. The content variants generated using the seed image 188, entity design data 182, entity style data 184, and text items 186 may all differ from each other, for example, using the seed image 188 or a seed image variant, having different arraignments and placements of the text items 186, and different applications of the entity style data 184 in rendering the text items 186.

Figure 2:
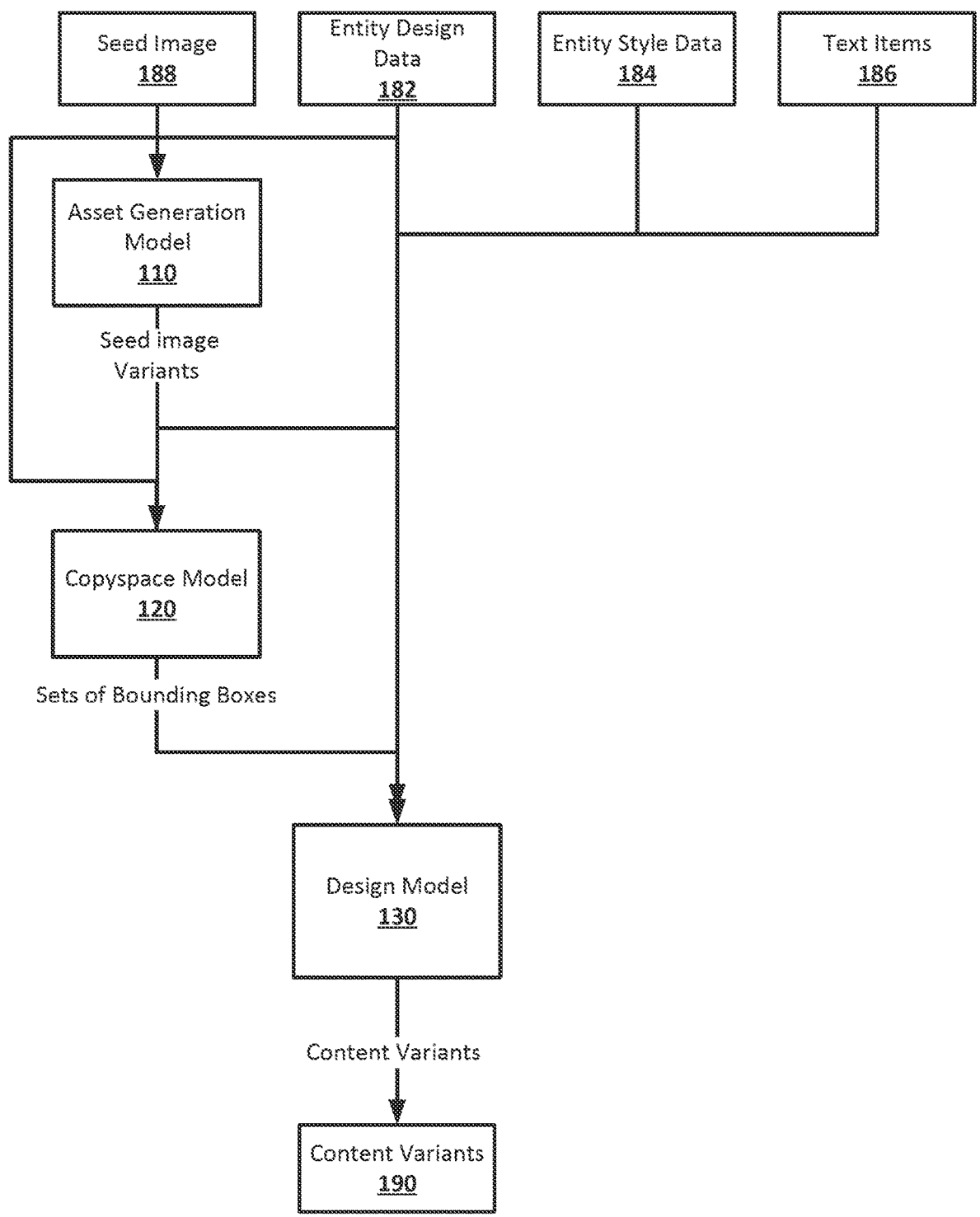
FIG. 2 shows an example arrangement suitable for style-based dynamic content generation according to an implementation of the disclosed subject matter.

FIG. 2 shows an example arrangement for suitable for style-based dynamic content generation according to an implementation of the disclosed subject matter. The seed image 188 may be received as input at the asset generation model 110. The asset generation model 110 may generate seed image variants from the seed image 188 by, for example, cropping the seed image 188 in different manners.

The seed image 188 and the seed image variants generated by the asset generation model 110 may be received as input by the copyspace model 120. The copyspace model 120 may generate sets of bounding boxes for the seed image 188 and for any seed image variants. The copyspace model 120 may, for example, detect objects depicted in the seed image 188 and generate bounding boxes that bound areas of the seed image 188 in which objects were not detected. The objects detected by the copyspace model 120 may be, for example, the subject of the seed image 188, such as, for example, products for which marketing content is being generated using the seed image 188. The seed image 188 and any seed image variants may be input to the copyspace model 120 in any suitable manner, such as, for example, sequentially. The copyspace model 120 may generate any number of sets of bounding boxes for the seed image 188 and any seed image variants input to the copyspace model 120. For example, if the copyspace model 120 is a GAN, the copyspace model 120 may utilize multiple random inputs along with the input of the seed image 188 to generate more than one set of bounding boxes for the seed image 188. Each set of bounding boxes generated by the copyspace model 120 may be associated with the seed image 188 or seed image variant that was input to the copyspace model to generate the set of bounding boxes.

The seed image 188, seed image variants generated by the asset generation model 110, sets of bounding boxes generated by the copyspace model 120, the entity design data 182, the entity style data 184, and text items 186 may be received as input at the design model 130. The design model 130 may use these inputs to generate the content variants 190. Each of the content variants generated by the design model 130 may be an image that is based on the seed image 188, or a seed image variant, and may include text items from the text items 186 arranged and placed in bounding boxes from one of the sets of bounding boxes for the seed image 188 or the seed image variant that is the basis for the content variant. The text items from the text items 186 may be arranged and placed in bounding boxes based on the entity design data 182, and may be rendered according to the entity style data 184. The entity style data 184 may also be used to add additional iconography, such as, logos for the entity, to the content variant. The design model 130 may generate additional sets of bounding boxes for the seed image 188 and any seed image variants by adjusting the bounding boxes in the sets of bounding boxes generated by the copyspace model 120. For example, the design model 130 may snap bounding boxes from the set of bounding boxes for the seed image 188 to edges of the seed image 188, or to gridlines that mark significant divisions of the seed image 188. The design model 130 may also add bounding boxes to sets of bounding boxes to bound areas of the images not already bound by the bounding boxes. These additional sets of bounding boxes may be used by the design model 130 in the generation of content variants.

The content variants 190 generated by the design model 130 may be stored in any suitable format. For example, the content variants 190 may be stored as flattened image files in any suitable image file format, or may be stored in a layered format or other format that may allow for easier editing of individual elements of the content variant, such as the text items from the text items 186.

Figure 3A:
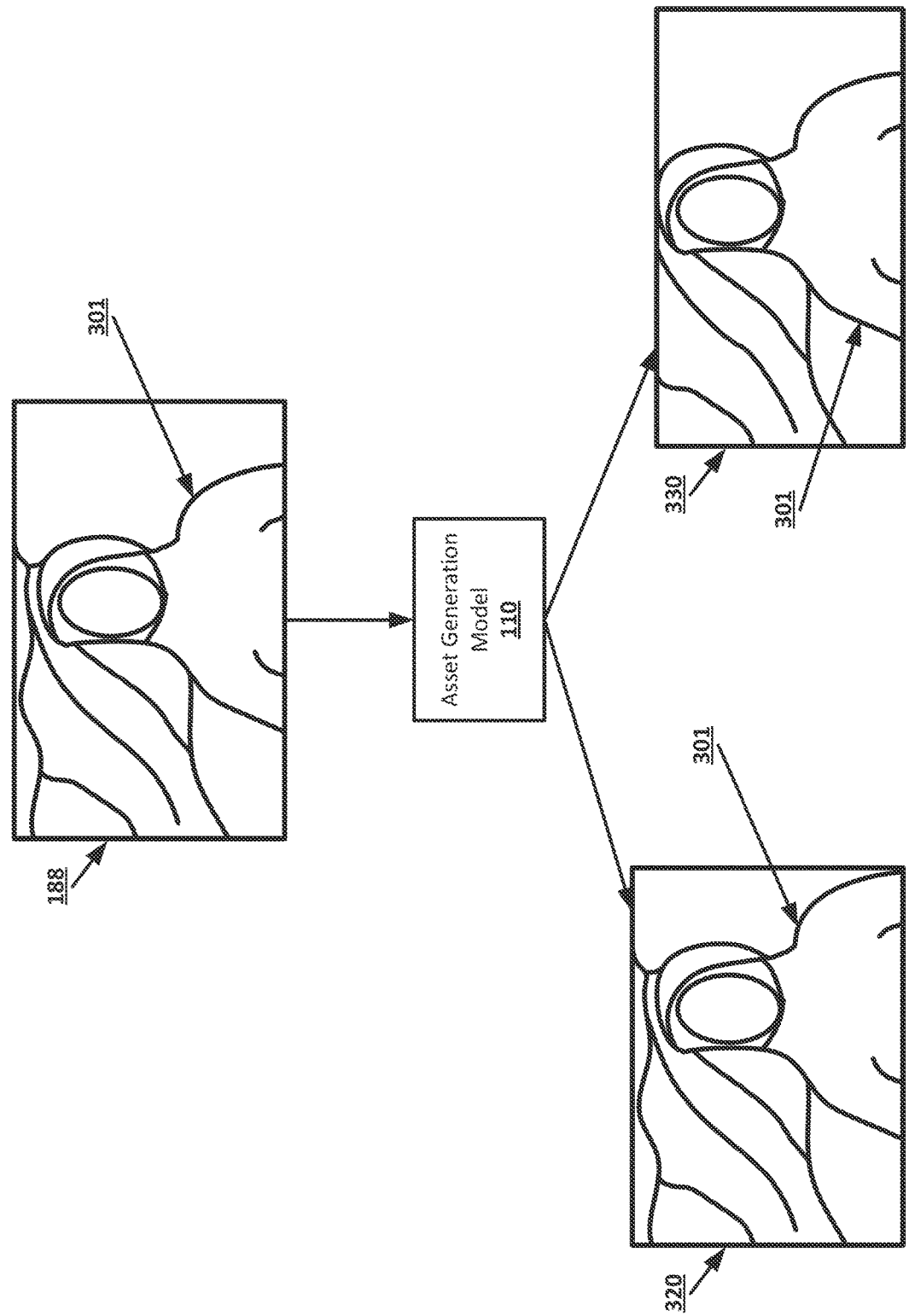
FIG. 3A shows an example arrangement suitable for style-based dynamic content generation according to an implementation of the disclosed subject matter.

FIG. 3A shows an example arrangement for suitable for style-based dynamic content generation according to an implementation of the disclosed subject matter. The seed image 188 may be received as input by the asset generation model 110. The seed image 188 may depict an object 301, such as, for example, a person wearing a jacket with the hood up. The asset generation model 110 may generate seed image variants 320 and 330 by applying different cropping to the seed image 188. The asset generation model 110 may perform cropping of the seed image 188 in such a way that the object 201 is not cropped out of the seed image variants 320 and 330. For example, the asset generation model 110 may be a GAN, and the discriminator network of the GAN may be trained to reject an image from the generator network of the GAN that has cropped out an object identified in the image input to the GAN, such a the object 301 of the seed image 188.

Figure 3C:
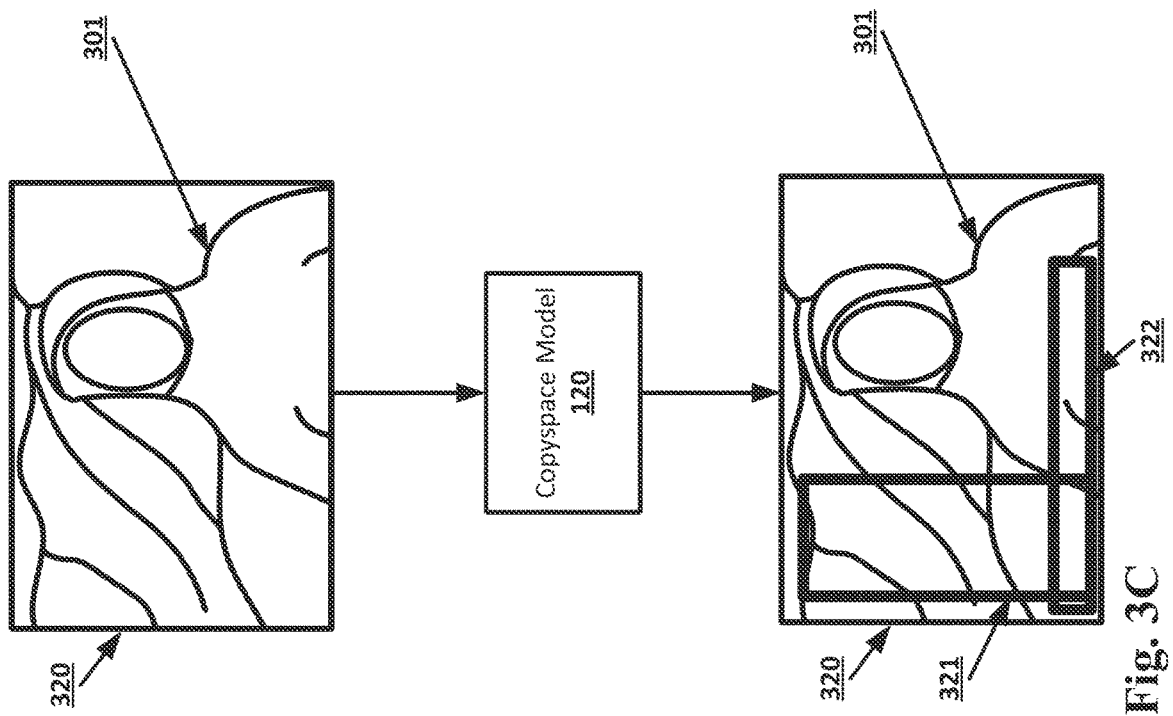
FIG. 3C shows an example arrangement suitable for style-based dynamic content generation according to an implementation of the disclosed subject matter.
Figure 3B:
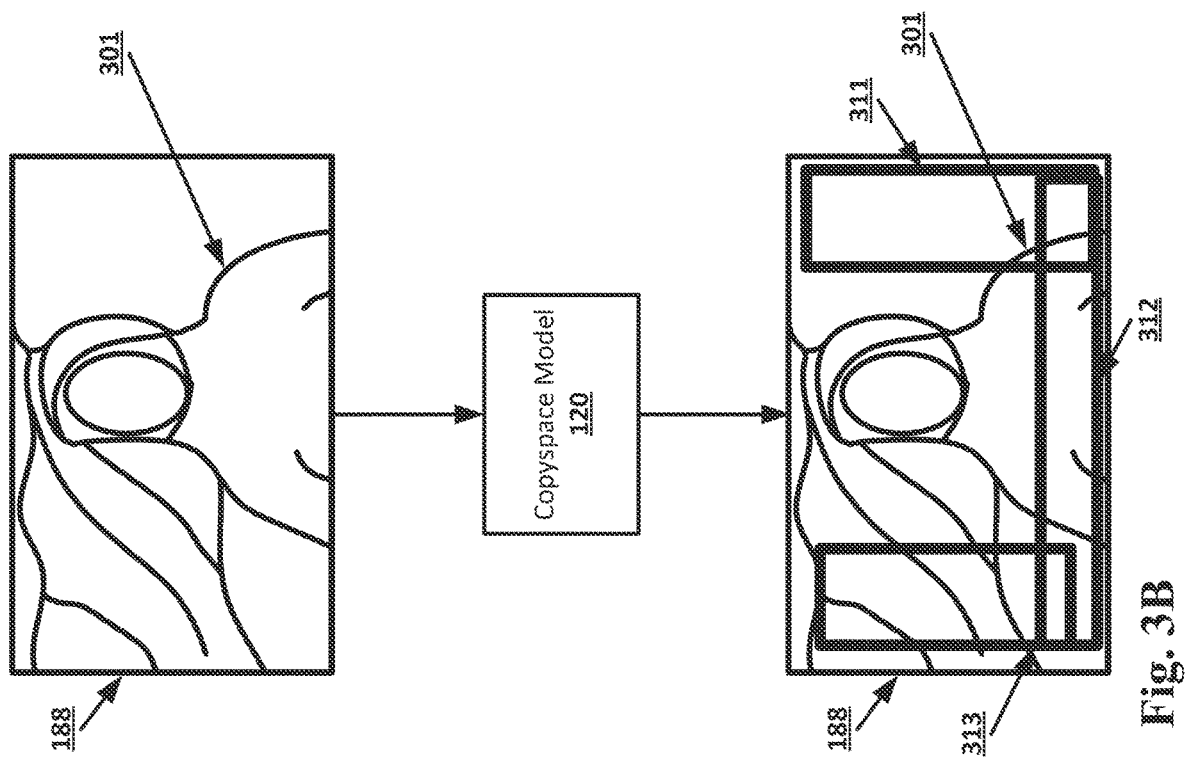
FIG. 3B shows an example arrangement suitable for style-based dynamic content generation according to an implementation of the disclosed subject matter.

FIG. 3B shows an example arrangement for suitable for style-based dynamic content generation according to an implementation of the disclosed subject matter. The seed image 188 may be received as input by the copyspace model 120. The copyspace model 120 may generate a set of bounding boxes for the seed image 188. The set of bounding boxes generated by the copyspace model 120 may include bounding boxes 311, 312, and 313. The bounding boxes 311, 312, and 313 may bound areas of the seed image 188 that the copyspace model 120 identifies as being usable for the placement of text, such as text items from the text items 186. The bounding boxes 311, 312, and 313 may, for example, bound areas of the seed image 188 that do not depict any of, or a significant part of, the object 301. Bounding boxes in a set of bounding boxes may overlap each other. For example, the bounding boxes 313 and 311 may both overlap with the bounding box 312. Bounding boxes may also overlap some portions of the object, for example, the object 301 in the seed image 188, such that they do not overlap significant portions of the object, such as portions that depict important visual details of the object that should not be obscured by text. For example, the bounding box 312 may overlap a portion at the bottom of the object 301, which may be the bottom portion of the jacket depicted in the seed image 188 and may not include significant visual details that would be obscured by text. The copyspace model 120 may, for example, be implemented using an object detection model that may generate the bounding boxes 311, 312, and 313 by detecting the object 301 in the seed image 188 and generating bounding boxes to bound areas of the seed image 188 outside of the object 301. Alternatively, the copyspace model 120 may be implemented using a GAN, with a discriminator network that may be trained to detect objects in images and determine if a bounding box generated by the generator network for the image overlaps a significant portion of the object, and to reject any bounding box that overlaps a significant portion of the object. The bounding boxes 311, 312, and 313 may be output by the copyspace model 120 in any suitable format, such as, for example, coordinates and/or parameters that can be used to describe the locations of the bounding boxes in the seed image 188 and the sizes of the bounding boxes.

FIG. 3C shows an example arrangement for suitable for style-based dynamic content generation according to an implementation of the disclosed subject matter. The seed image variant 320 may be received as input by the copyspace model 120. The copyspace model 120 may generate a set of bounding boxes for the seed image variant 320. The set of bounding boxes generated by the copyspace model 120 may include bounding boxes 321 and 322. The bounding boxes 321 and 322 may bound areas of the seed image variant 320 that the copyspace model 120 identifies as being usable for the placement of text, such as text items from the text items 186. The bounding boxes 321 and 322 may, for example, bound areas of the seed image variant 320 that do not depict any of, or a significant part of, the object 301. The bounding boxes 321 and 322 may be output by the copyspace model 120 in any suitable format, such as, for example, coordinates and/or parameters that can be used to describe the locations of the bounding boxes in the seed image variant 320 and the sizes of the bounding boxes.

Figure 3D:
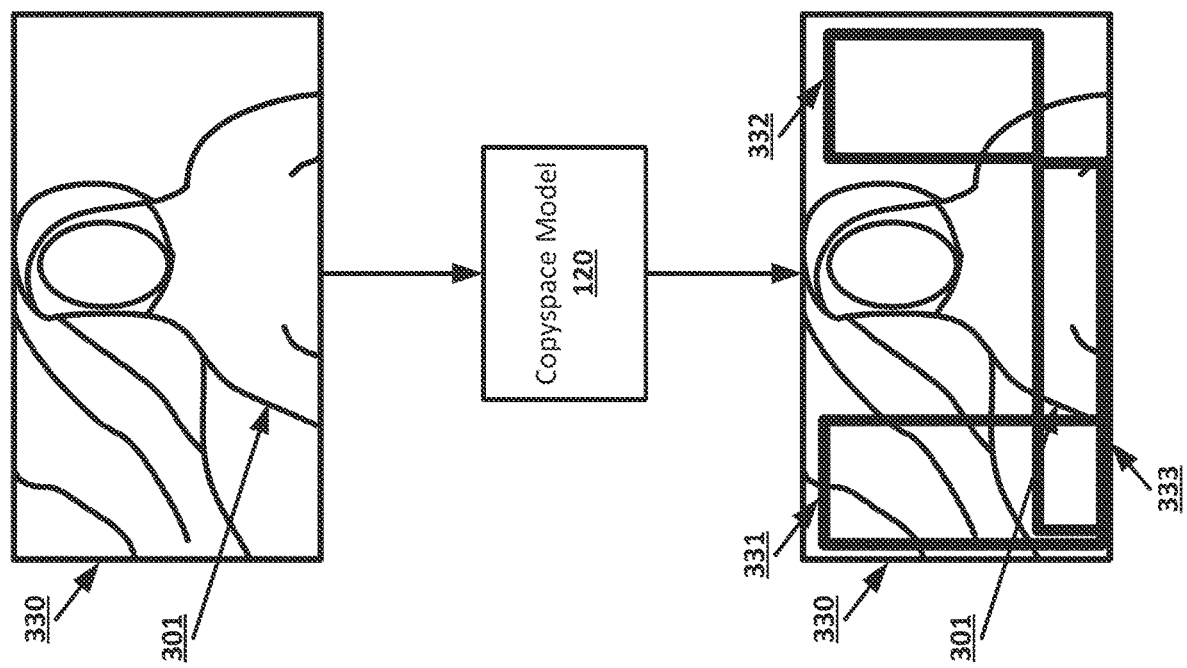
FIG. 3D shows an example arrangement suitable for style-based dynamic content generation according to an implementation of the disclosed subject matter.

FIG. 3D shows an example arrangement for suitable for style-based dynamic content generation according to an implementation of the disclosed subject matter. The seed image variant 330 may be received as input by the copyspace model 120. The copyspace model 120 may generate a set of bounding boxes for the seed image variant 330. The set of bounding boxes generated by the copyspace model 120 may include bounding boxes 321, 332, and 323. The bounding boxes 321, 332, and 323 may bound areas of the seed image variant 330 that the copyspace model 120 identifies as being usable for the placement of text, such as text items from the text items 186. The bounding boxes 321, 332, and 323 may, for example, bound areas of the seed image variant 330 that do not depict any of, or a significant part of, the object 301. The bounding boxes 321, 332, and 323 may be output by the copyspace model 120 in any suitable format, such as, for example, coordinates and/or parameters that can be used to describe the locations of the bounding boxes in the seed image variant 330 and the sizes of the bounding boxes.

Figure 3E:
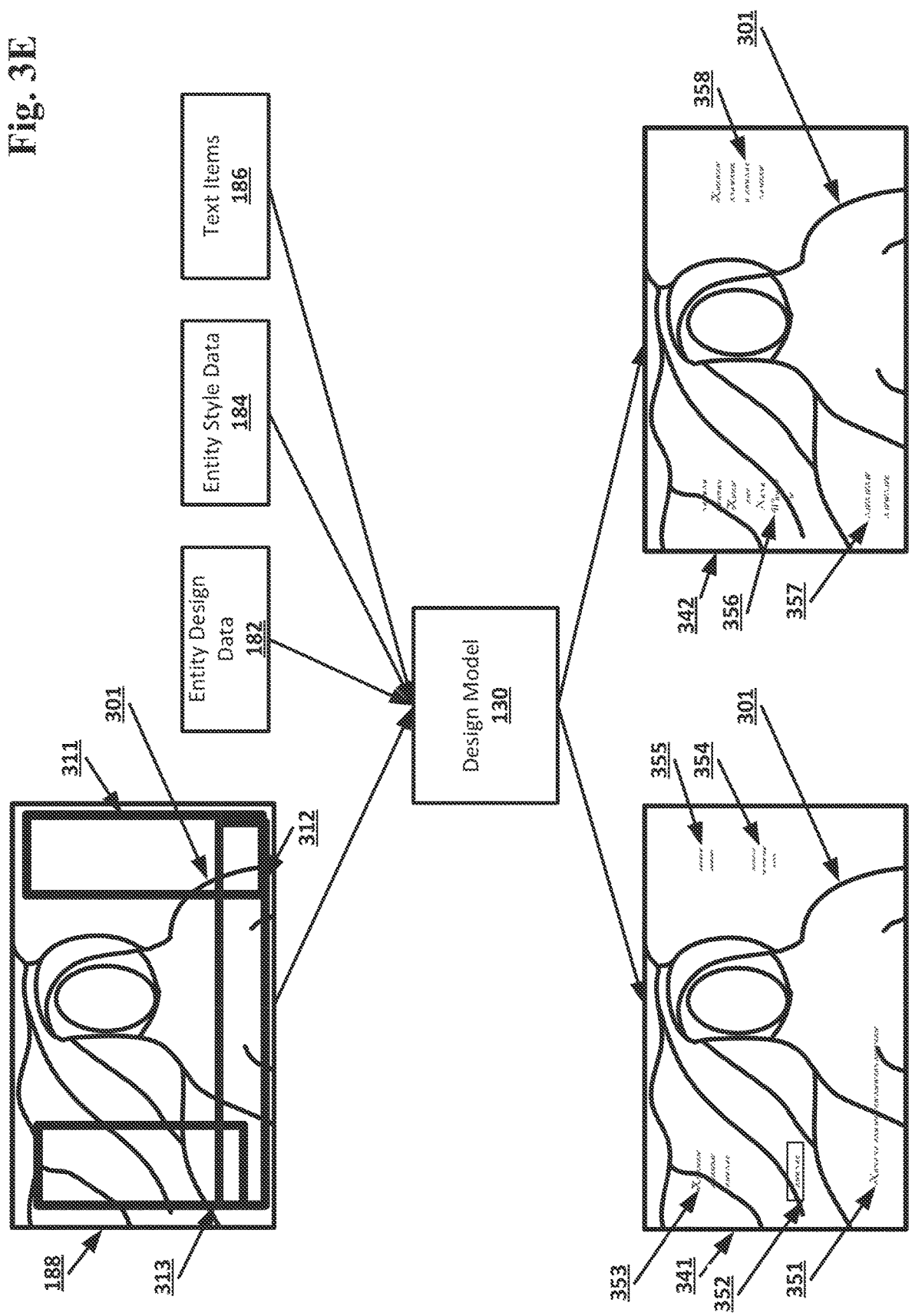
FIG. 3E shows an example arrangement suitable for style-based dynamic content generation according to an implementation of the disclosed subject matter.

FIG. 3E shows an example arrangement for suitable for style-based dynamic content generation according to an implementation of the disclosed subject matter. The seed image 188, set of bounding boxes for the seed image 188 including the bounding boxes 311, 312, and 313, the entity design data 182, the entity style data 184, and the text items 186, may be received as input at the design model 130, which may generate the content variants 341 and 342. The content variant 341 may be based on the seed image 188, and may include text items from the text items 186 arranged and placed on the seed image 188 by the design model 130 according to the entity design data 182. For example, the design model 130 may place a text item 353 and a text item 352 from the text items 186 in an area of the seed image 188 bounded by the bounding box 313, a text item 351 from the text items 186 in an area of the seed image 188 bounded by the bounding box 312, and a text item 354 and a text 355 from the text items 186 in an area of the seed image 188 bounded by the bounding box 311. The design model 130 may render the text items 351, 352, 353, 354, and 355 according to the entity style data 184, for example, changing font faces, font sizes, font style, font weight, and colors and setting spacing for letters and words. The content variant 341 may thus include text items from the text items 186 arranged and placed on the seed image 188 in areas bounded by the bounding boxes 311, 312, and 313 according to the entity design data 182 and rendered according to the entity style data 186. The design model 130 may also, before arranging and placing the text items from the text items 186, adjust any of the bounding boxes 311, 312, and 313, for example, moving the left edge of the bounding box 313 to the left edge of the seed image 188.

The content variant 342 may be based on the seed image 188, and may include text items from the text items 186 arranged and placed on the seed image 188 by the design model 130 according to the entity design data 182. For example, the design model 130 may place a text item 356 from the text items 186 in an area of the seed image 188 bounded by the bounding box 313, a text item 357 from the text items 186 in an area of the seed image 188 bounded by the bounding box 312, and a text item 358 from the text items 186 in an area of the seed image 188 bounded by the bounding box 311. The design model 130 may render the text items 356, 357, and 358 according to the entity style data 184, for example, changing font faces, font sizes, font style, font weight, and colors and setting spacing for letters and words. The text items 356, 357, and 358 from the text items 186 may be different from, and arranged, placed and rendered differently from, the text items 351, 352, 353, 354, and 355 placed in the content variant 341, through some of the text items may be the same, and some placements may be the same, and some rendering may be the same. For example, the text item 357 and the text item 355 may be the same text item from the text items 186 placed and rendered differently. The content variant 342 may thus include text items from the text items 186 arranged and placed on the seed image 188 in areas bounded by the bounding boxes 311, 312, and 313 according to the entity design data 182 and rendered according to the entity style data 186, and may differ from the content variant 341. For example, a GAN may be used to implement the design model 130, and a different random number may be used as input along with the seed image 188, set of bounding boxes for the seed image 188 including the bounding boxes 311, 312, and 313, the entity design data 182, the entity style data 184, and the text items 186 to cause the design model 130 to generate different content variants for each random number. The design model 130 may generate any number of content variants based on the input of the seed image 188, set of bounding boxes for the seed image 188 including the bounding boxes 311, 312, and 313, the entity design data 182, the entity style data 184, and the text items 186, and any other input, such as random numbers, that may be used to create differences in the content variants.

Figure 3F:
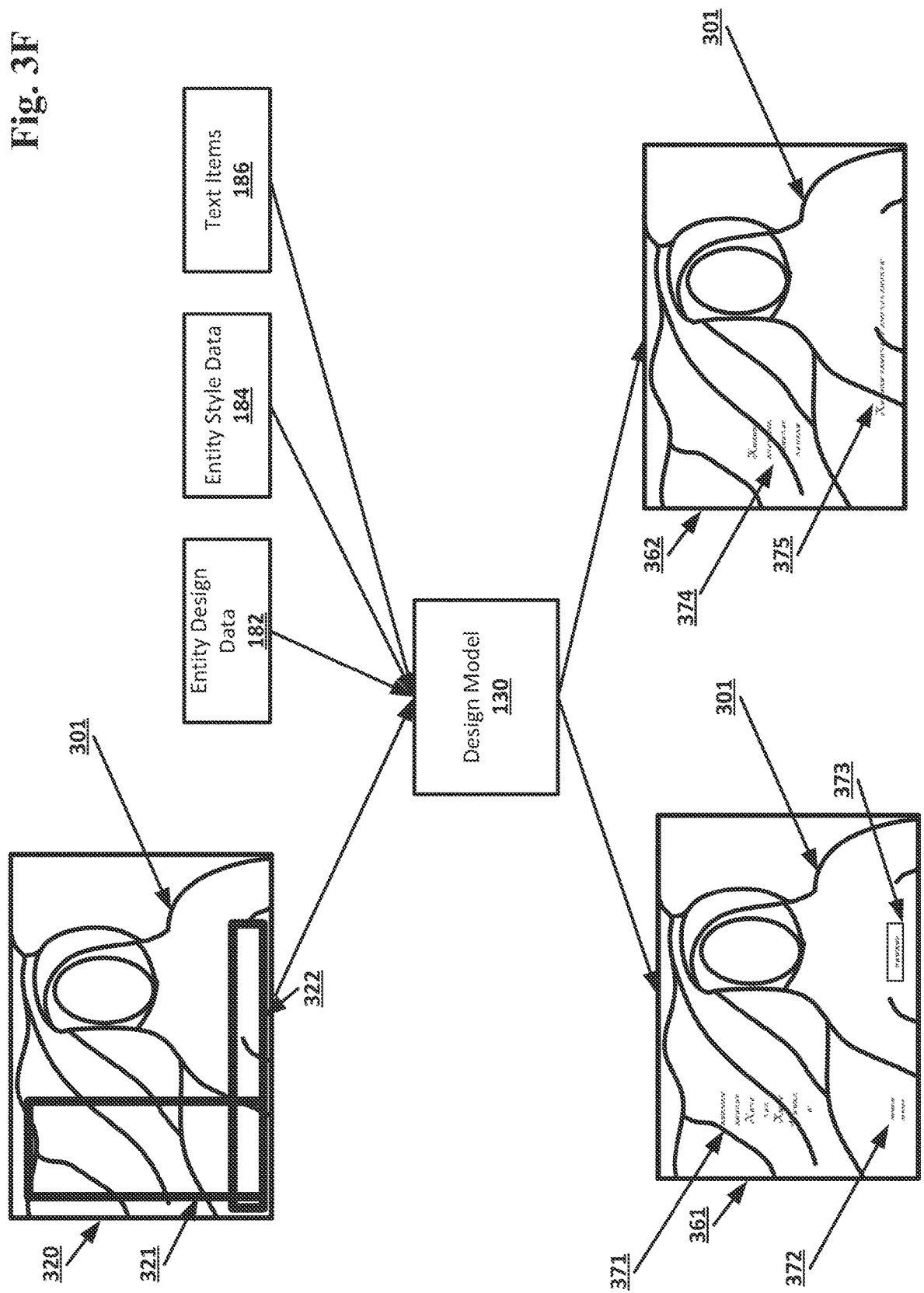
FIG. 3F shows an example arrangement suitable for style-based dynamic content generation according to an implementation of the disclosed subject matter.

FIG. 3F shows an example arrangement for suitable for style-based dynamic content generation according to an implementation of the disclosed subject matter. The seed image variant 320, set of bounding boxes for the seed image variant 320 including the bounding boxes 321 and 322, the entity design data 182, the entity style data 184, and the text items 186, may be received as input at the design model 130, which may generate the content variants 361 and 362. The content variant 361 may be based on the seed image variant 320, and may include text items from the text items 186 arranged and placed on the seed image variant 320 by the design model 130 according to the entity design data 182. For example, the design model 130 may place a text item 371 from the text items 186 in an area of the seed image variant 320 bounded by the bounding box 321 and a text item 372 and a text item 373 from the text items 186 in an area of the seed image variant 320 bounded by the bounding box 322. The design model 130 may render the text items 371, 372, and 373 according to the entity style data 184, for example, changing font faces, font sizes, font style, font weight, and colors and setting spacing for letters and words. The content variant 361 may thus include text items from the text items 186 arranged and placed on the seed image variant 320 in areas bounded by the bounding boxes 321 and 322 according to the entity design data 182 and rendered according to the entity style data 186. The design model 130 may also, before arranging and placing the text items from the text items 186, adjust any of the bounding boxes 321 and 322, for example, moving the left edge of the bounding box 321 to the left edge of the seed image variant 320.

The content variant 362 may be based on the seed image variant 320, and may include text items from the text items 186 arranged and placed on the seed image variant 320 by the design model 130 according to the entity design data 182. For example, the design model 130 may place a text item 374 from the text items 186 in an area of the seed image variant 320 bounded by the bounding box 321 and a text item 375 from the text items 186 in an area of the seed image variant 320 bounded by the bounding box 322. The design model 130 may render the text items 374 and 375 according to the entity style data 184, for example, changing font faces, font sizes, font style, font weight, and colors and setting spacing for letters and words. The text items 374 and 375 from the text items 186 may be different from, and arranged, placed and rendered differently from, the text items 371, 372, and 373 placed in the content variant 361, through some of the text items may be the same, and some placements may be the same, and some rendering may be the same. The content variant 362 may thus include text items from the text items 186 arranged and placed on the seed image variant 320 in areas bounded by the bounding boxes 321 and 322 according to the entity design data 182 and rendered according to the entity style data 186, and may differ from the content variant 361. The design model 130 may generate any number of content variants based on the input of the seed image variant 320, set of bounding boxes for the seed image variant 320 including the bounding boxes 321 and 322, the entity design data 182, the entity style data 184, and the text items 186, and any other input, such as random numbers, that may be used to create differences in the content variants.

Figure 3G:
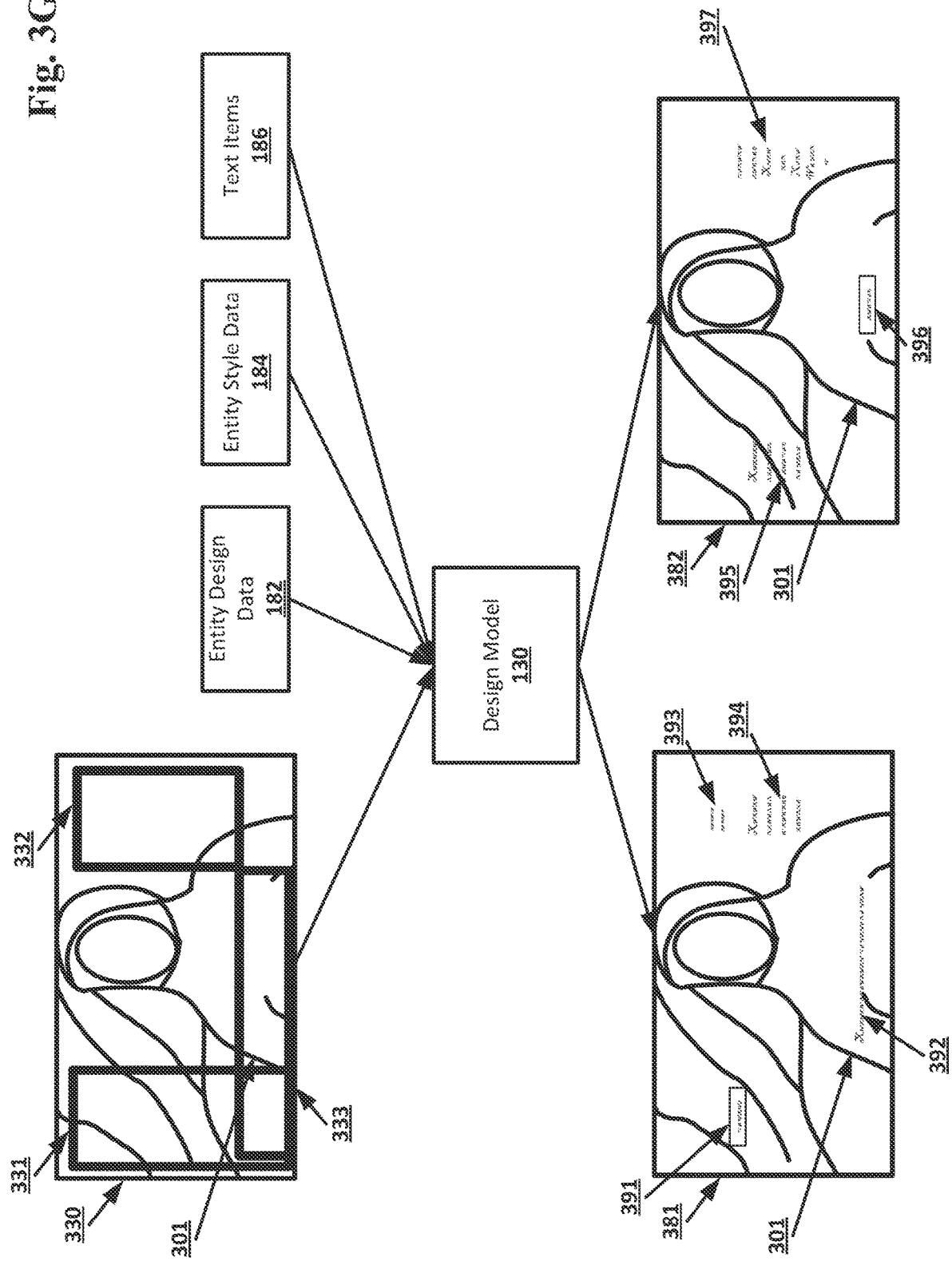
FIG. 3G shows an example arrangement suitable for style-based dynamic content generation according to an implementation of the disclosed subject matter.

FIG. 3G shows an example arrangement for suitable for style-based dynamic content generation according to an implementation of the disclosed subject matter. The seed image variant 330, set of bounding boxes for the seed image variant 330 including the bounding boxes 331, 332 and 333, the entity design data 182, the entity style data 184, and the text items 186, may be received as input at the design model 130, which may generate the content variants 381 and 382. The content variant 381 may be based on the seed image variant 330, and may include text items from the text items 186 arranged and placed on the seed image variant 330 by the design model 130 according to the entity design data 182. For example, the design model 130 may place a text item 391 from the text items 186 in an area of the seed image variant 330 bounded by the bounding box 331, a text item 392 from the text items 186 in an area of the seed image variant 330 bounded by the bounding box 333, and a text item 393 and a text item 394 from the text items 186 in an area of the seed image variant 330 bounded by the bounding box 332. The design model 130 may render the text items 391, 392, 393, and 394 according to the entity style data 184, for example, changing font faces, font sizes, font style, font weight, and colors and setting spacing for letters and words. The content variant 381 may thus include text items from the text items 186 arranged and placed on the seed image variant 330 in areas bounded by the bounding boxes 331, 332, and 333 according to the entity design data 182 and rendered according to the entity style data 186. The design model 130 may also, before arranging and placing the text items from the text items 186, adjust any of the bounding boxes 331, 332, and 333, for example, moving the bottom edge of the bounding box 332 to the bottom edge of the seed image variant 330.

The content variant 382 may be based on the seed image variant 330, and may include text items from the text items 186 arranged and placed on the seed image variant 330 by the design model 130 according to the entity design data 182. For example, the design model 130 may place a text item 395 from the text items 186 in an area of the seed image variant 330 bounded by the bounding box 331, a text item 396 from the text items 186 in an area of the seed image variant 330 bounded by the bounding box 333, and a text item 397 from the text items 186 in an area of the seed image variant 330 bounded by the bounding box 332. The design model 130 may render the text items 395, 396, and 397 according to the entity style data 184, for example, changing font faces, font sizes, font style, font weight, and colors and setting spacing for letters and words. The text items 395, 396, and 397 from the text items 186 may be different from, and arranged, placed and rendered differently from, the text items 391, 392, 393, and 394 placed in the content variant 381, through some of the text items may be the same, and some placements may be the same, and some rendering may be the same. The content variant 382 may thus include text items from the text items 186 arranged and placed on the seed image variant 330 in areas bounded by the bounding boxes 331, 332, and 333 according to the entity design data 182 and rendered according to the entity style data 186, and may differ from the content variant 381. The design model 130 may generate any number of content variants based on the input of the seed image variant 330, set of bounding boxes for the seed image variant 330 including the bounding boxes 331, 332, and 333, the entity design data 182, the entity style data 184, and the text items 186, and any other input, such as random numbers, that may be used to create differences in the content variants.

The content variants 341, 342, 361, 362, 381 and 382, and any other content variants generated using the seed image 188 or variant generated from the seed image 188, the entity design data 182, the entity style data 184, and the text items 186 may be stored with the content variants 190. The content variants 190 may be used in any suitable manner. For example, one of the content variants 190 may be selected to be used to market a product that the seed image 188 was selected to be used as the basis of marketing materials for. The content variant 342, for example, may be placed on a website associated the entity from whom the entity design data 182 and the entity style data 184 was gathered that sells the product. Different content variants may be used in various marketing materials for the product. Two or more of the content variants may be used in A/B testing on a website for the product. The content variants 190 may also be ranked, for example, based on how different each content variant is from the other content variants.

Figure 4:
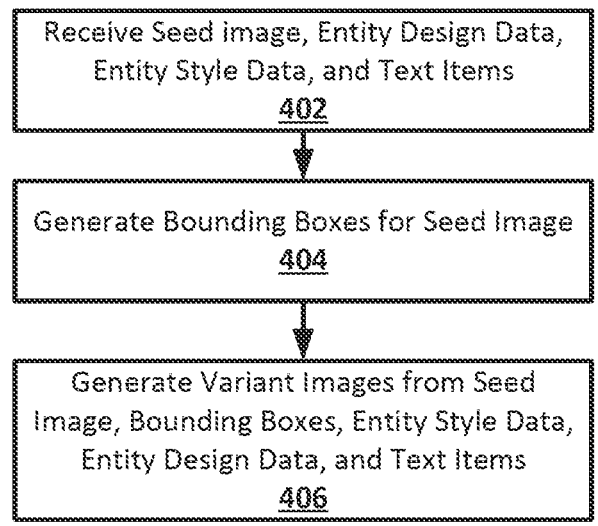
FIG. 4 shows an example procedure suitable for style-based dynamic content generation according to an implementation of the disclosed subject matter.

FIG. 4 shows an example procedure suitable for style-based dynamic content generation according to an implementation of the disclosed subject matter. At 402, a seed image, entity design data, entity style data, and text items may be received may be received. For example, the seed image 188, the entity design data 182, the entity style data 184, and the text items 186 may be received from the storage 170 of the computing device 100. The seed image 188 may be an image to be used to generate variant images that are related to a particular object, such as product, service, or concept that may or may not be directly depicted in the seed image 188. For example, the design model 130 may receive the seed image 188, the entity design data 182, the entity style data 184, and the text items 186. The entity design data 182 and the entity style data 184 may have been gathered for the same entity, which may be associated with the object, service, or concept that the seed image 188 will be used to generate variant images for. The text items 186 may be any number of items of written text that may relate to the object, service, or concept for which the seed image 188 will be used to generate variant images for. For example, the text items 186 may include copywritten text describing the object service, concept, and/or the associated entity, and may also include text that may be used as labels for interactive elements, such as buttons on a webpage. The text items 186 may, for example, have been generated using a text style transformer model.

At 404, bounding boxes may be generated for the seed image. For example, the seed image 188 may be received as input at the copyspace model 120. The copyspace model 120 may generate sets of bounding boxes for the seed image 188. The copyspace model 120 may, for example, identify objects depicted in the seed image 188, and may generate bounding boxes that bound areas of the seed image 188 that do not include significant portions of any identified objects, such as, for example, the bounding boxes 311, 312, and 313. The copy space model 120 may generate any number of sets of bounding boxes for the seed image 188, and each set of bounding boxes may include any number of individual bounding boxes.

At 406, variant images may be generated from the seed image, bounding boxes, entity style data, entity design data, and text items. For example, the design model 130 may receive as input the seed image 188, the bounding boxes 311, 312, and 313, the entity design data 182, the entity style data 184, and the text items 186, and generate any number of variant images, or content variants. The design model 130 may use the entity design data 182 to determine how to arrange and place text items from the text items 186 in the bounding boxes 311, 312, and 313. The design model 130 may use the entity style data 184 to determine how to render the placed and arranged text items from the text items 186, for example, changing font faces, font sizes, font style, font weight, and colors, letter and word spacing, and another other suitable typographical aspect of the visual rendering of the text items 186. The design model 130 may also adjust the contrast of the text items from the text items 186 with the seed image 188, for example, based on an image spectra of the areas of the seed image 188 in which the text items are arranged and placed by the design model 130. The design model 130 may generate any number of variant images, or content variants, by using any number of different arrangements and placements within the bounding boxes 311, 312, and 313, of any number of different text items from the text items 186, with any number of different rendering, so long as the arrangement, placement, and rendering of the text items from the text items 186 is done according to the entity design data 182 and the entity style 184. The design model 130 may generate additional variant images by adjusting the bounding boxes 311, 312, and 313, for example, moving an edge of a bounding box to an edge of the seed image 188 or to a horizontal or vertical gridline at a significant division of the seed image 188, and using the adjusted bounding boxes when placing and arranging text items from the text items 186. The variant images, or content variants, generated by the design model 130 may be stored with the content variants 190, and may be used in any suitable manner.

Figure 5:
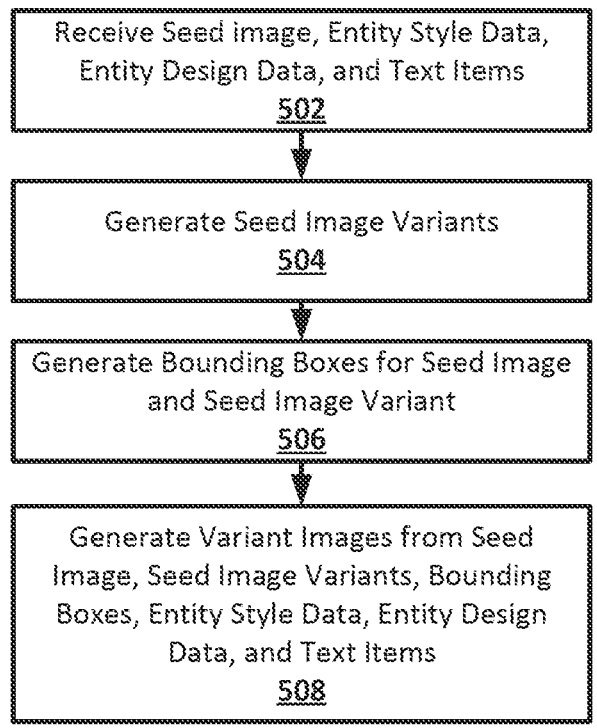
FIG. 5 shows an example procedure suitable for style-based dynamic content generation according to an implementation of the disclosed subject matter.

FIG. 5 shows an example procedure suitable for style-based dynamic content generation according to an implementation of the disclosed subject matter. At 502, a seed image, entity design data, entity style data, and text items may be received may be received. For example, the seed image 188, the entity design data 182, the entity style data 184, and the text items 186 may be received from the storage 170 of the computing device 100. The seed image 188 may be an image to be used to generate variant images that are related to a particular object, such as product, service, or concept that may or may not be directly depicted in the seed image 188. For example, the design model 130 may receive the seed image 188, the entity design data 182, the entity style data 184, and the text items 186. The entity design data 182 and the entity style data 184 may have been gathered for the same entity, which may be associated with the object, service, or concept that the seed image 188 will be used to generate variant images for. The text items 186 may be any number of items of written text that may relate to the object, service, or concept for which the seed image 188 will be used to generate variant images for. For example, the text items 186 may include copywritten text describing the object service, concept, and/or the associated entity, and may also include text that may be used as labels for interactive elements, such as buttons on a webpage. The text items 186 may, for example, have been generated using a text style transformer model.

At 504, seed image variants may be generated. For example, the seed image 188 may be received as input at the asset generating model 110. The asset generating model 110 may generate seed image variants from the seed image 188 by, for example, cropping the seed image 188. The seed image variants, for the seed image variants 320 and 330, may be cropped such that an object in the seed image 188, for example, the object 301, is not cropped out of the seed image variants 320 and 320. The asset generation model 110 may generate any number of seed image variants from the seed image 188.

At 506, bounding boxes may be generated for the seed image and seed image variants. For example, the seed image 188 and the seed image variants 320 and 330 may be received as input at the copyspace model 120. The copyspace model 120 may generate sets of bounding boxes for the seed image 188 and the seed image variants 320 and 330. The copyspace model 120 may, for example, identify objects depicted in the seed image 188 as well as the seed image variants 320 and 330, and may generate bounding boxes that bound areas of the seed image 188 and the seed image variants 320 and 330 that do not include significant portions of any identified objects, such as, for example, the bounding boxes 311, 312, and 313 for the seed image 188, the bounding boxes 321 and 322 for the seed image variant 320, and the bounding boxes 331, 332, and 333 for the seed image variant 330. The copy space model 120 may generate any number of sets of bounding boxes for the seed image 188 and the seed image variants 320 and 330, and each set of bounding boxes may include any number of individual bounding boxes. The seed image 188, the seed image variant 320, and the seed image variant 330 may be input to the copyspace model 120 in any suitable manner, including, for example, sequentially.

At 508, variant images may be generated from the seed image, seed image variants, bounding boxes, entity style data, entity design data, and text items. For example, the design model 130 may receive as input the seed image 188, the seed image variants 320 and 330, the bounding boxes 311, 312, and 313, 321, 322, 331, 332, and 333, the entity design data 182, the entity style data 184, and the text items 186, and generate any number of variant images, or content variants. The design model 130 may use the entity design data 182 to determine how to arrange and place text items from the text items 186 in the bounding boxes 311, 312, and 313 to generate variant images from the seed image 188, in the bounding boxes 321 and 322 to generate image variants from the seed image variant 320, and in the bounding boxes 331, 332, and 333 to generate variant images from the seed image variant 330. The design model 130 may use the entity style data 184 to determine how to render the placed and arranged text items from the text items 186, for example, changing font faces, font sizes, font style, font weight, and colors, letter and word spacing, and another other suitable typographical aspect of the visual rendering of the text items 186. The design model 130 may also adjust the contrast of the text items from the text items 186 with the image on which they're placed. The design model 130 may generate any number of variant images, or content variants, by using any number of different arrangements and placements within the bounding boxes 311, 312, and 313, 321 and 322, and 331, 332, and 333, of any number of different text items from the text items 186, with any number of different rendering, so long as the arrangement, placement, and rendering of the text items from the text items 186 is done according to the entity design data 182 and the entity style data 184. The design model 130 may generate additional variant images by adjusting the bounding boxes 311, 312, 313, 321, 322, 331, 332, and 333, for example, moving an edge of a bounding box to an edge or to a horizontal or vertical gridline at a significant division of the seed image or seed image variant the bounding box was generated for, and using the adjusted bounding boxes when placing and arranging text items from the text items 186. The variant images, or content variants, generated by the design model 130 may be stored with the content variants 190, and may be used in any suitable manner. The seed image 188 with the bounding boxes 311, 312, and 313, the seed image variant 320 with bounding boxes 321 and 322, and the seed image variant 330 with the bounding boxes 331, 332, and 333, may be input to the design model 130 in any suitable manner, including, for example, sequentially.

Figure 6:
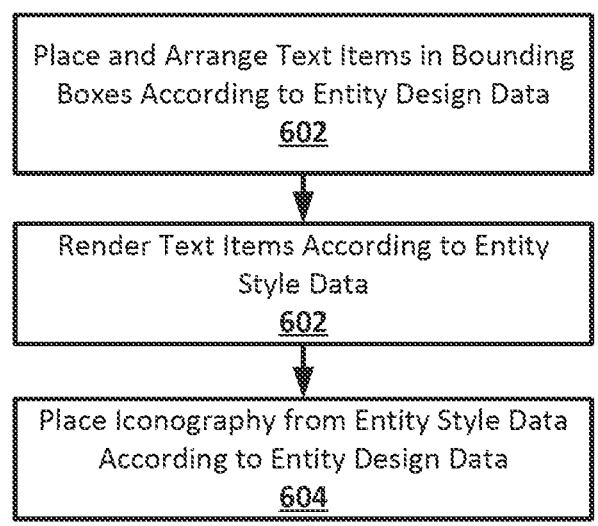
FIG. 6 shows an example procedure suitable for style-based dynamic content generation according to an implementation of the disclosed subject matter.

FIG. 6 shows an example procedure suitable for style-based dynamic content generation according to an implementation of the disclosed subject matter. At 602, text items may be placed and arranged in bounding boxes according to entity design data. For example, the design model 130 may receive as input the seed image 188, the set of bounding boxes including the bounding boxes 311, 312, and 313, the entity design data 182, the entity style data 184, and the text items 186. The design model may select text items from the text items 186 and place them within the bounding boxes 311, 312, and 313 on the seed image 188 in accordance with the entity design data 182. The design model 130 may arrange the selected text items within the bounding boxes 311, 312, and 313 in any suitable manner in accordance with the entity design data 182. The entity design data 182 may indicate, for example, how many text items should be placed within the bounding boxes 311, 312, and 313, and how the text items should be arranged relative to each other.

At 604, text items may be rendered according to entity style data. For example, the design model 130, after or while placing and arranging selected text items from the text items 186 in the bounding boxes 311, 312, and 313, may render the selected text items according to the entity style data 184. The design model 130 may, for example, select a font face, font size, font style, font weight, and color, letter spacing, word spacing, justification, and any other typographic feature for which there is data in the entity style data 184 for each selected text item, and may render the text items on the seed image 188 based on the selected features. For example, the entity style data 184 may include three different font faces and, and the design model 130 may select from among the three font faces for each selected text item placed on the seed image 188.

At 604, iconography from entity style data may be placed according to entity design data. For example, the design model 130, in addition to placing and arranging text items from the text items 186 in the bounding boxes 311, 312, and 313, place iconography from the entity style data 184 on the seed image 188 in accordance with the entity design data 182. The iconography may be, for example, brand logos or other images associated with the entity from which the entity style data 184 and the entity design data 182 was gathered. The design model 130 may place any number of different items of iconography within the bounding boxes 311, 312, and 313 on the seed image 188.

Figure 7:
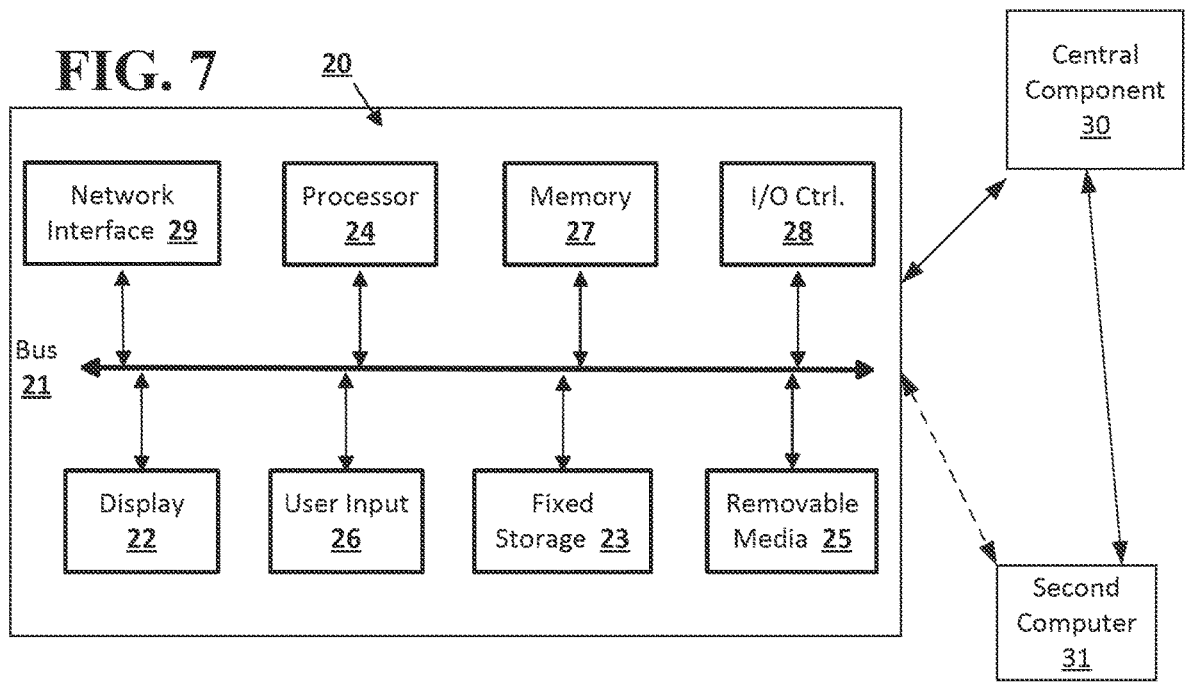
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
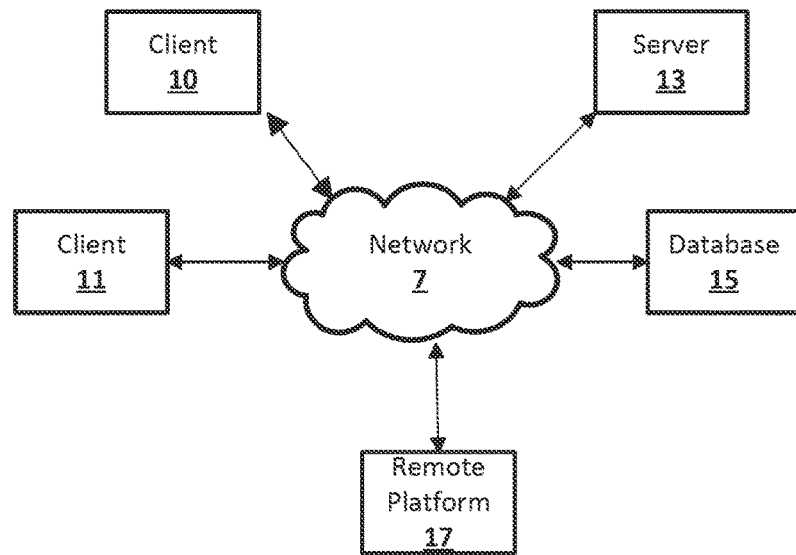
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving a seed image, entity design data, entity style data, and one or more text items;
generating for the seed image one or more bounding boxes that identify one or more areas of the seed image for the placement of the one or more text items;
generating from the seed image, the entity design data, and the entity style data two or more variant images, wherein each of the variant images is generated by placing text items of the one or more text items and one or more items of iconography in one or more of the one or more bounding boxes, wherein a style of at least one of the one more or text items is based on a position of the at least one of the one or more text items and entity styles for text in different positions from the entity design data, positioning of at least one of the one or more text items relative to at least one of the one or more items of iconography is based on the entity design data and wherein text of the text items is rendered using the entity style data, and further comprising adjusting an image spectra of at least one of the one or more bounding boxes based on the image spectra of the one of the one more bounding boxes and a color of one of the one or more text items in the one of the one or more bounding boxes;
generating at least one additional bounding box for the seed image to cover an area between a boundary of one of the one or more bounding boxes and a horizontal or vertical edge of the seed image.

2. The computer-implemented method of claim 1, wherein the entity style data comprises one or more of font faces, font sizes, font style, font weight, colors, and spacing.

3. The computer-implemented method of claim 1, further comprising generating the one or more text items using a text style transformer model trained using text items from the entity.

4. The computer-implemented method of claim 1, wherein generating for the seed image one or more bounding boxes that identify one or more areas of the seed image for the placement of the one or more text items comprises inputting the seed image to a one of object detection model or a generative adversarial network.

5. The computer-implemented method of claim 1, further comprising:
generating, from the seed image, a seed image variant;
generating for the seed image variant one or more bounding boxes that identify one or more areas of the seed image variant for the placement of the one or more text items; and
generating from the seed image variant, the entity design data, and the entity style data two or more additional variant images, wherein each of the additional variant images is generated by placing text items of the one or more text items in one or more of the one or more bounding boxes, generated for the seed image variant, based on the entity design data and wherein text of the text items is rendered using the entity style data.

6. The computer-implemented method of claim 5, wherein generating the seed image variant comprises cropping the seed image such that an object of the seed image is not cropped out.

7. The computer-implemented method of claim 1, further comprising generating additional sets of bounding boxes for the seed image by adjusting at least one edge of at least one of the one or more bounding boxes.

8. The computer-implemented method of claim 1, wherein generating from the seed image, the entity design data, and the entity style data two or more variant images, comprises using the seed image, bounding boxes, entity style data, and one or more text items as input to a generative adversarial network.

9. The computer-implemented method of claim 1, wherein the entity design data comprises statistical data gathered from content associated with an entity from which the entity style data was gathered.

10. A computer-implemented system comprising:
one or more storage devices; and
a processor that receives a seed image, entity design data, entity style data, and one or more text items,
generates for the seed image one or more bounding boxes that identify one or more areas of the seed image for the placement of the one or more text items,
generates from the seed image, the entity design data, and the entity style data two or more variant images, wherein each of the variant images is generated by placing text items of the one or more text items and one or more items of iconography in one or more of the one or more bounding boxes, wherein a style of at least one of the one more or text items is based on a position of the at least one of the one or more text items and entity styles for text in different positions from the entity design data, positioning of at least one of the one or more text items relative to at least one of the one or more items of iconography is based on the entity design data and wherein text of the text items is rendered using the entity style data, and further adjusts an image spectra of at least one of the one or more bounding boxes based on the image spectra of the one of the one more bounding boxes and a color of one of the one or more text items in the one of the one or more bounding boxes, and
generates at least one additional bounding box for the seed image to cover an area between a boundary of one of the one or more bounding boxes and a horizontal or vertical edge of the seed image.

11. The computer-implemented system of claim 10, wherein the entity style data comprises one or more of font faces, font sizes, font style, font weight, colors, and spacing.

12. The computer-implemented system of claim 10, wherein the processor further generates the one or more text items using a text style transformer model trained using text items from the entity.

13. The computer-implemented system of claim 10, wherein the processor generates for the seed image one or more bounding boxes that identify one or more areas of the seed image for the placement of the one or more text items by inputting the seed image to a one of object detection model or a generative adversarial network.

14. The computer-implemented system of claim 10, where the processor further generates, from the seed image, a seed image variant,
- generates for the seed image variant one or more bounding boxes that identify one or more areas of the seed image variant for the placement of the one or more text items, and
- generates from the seed image variant, the entity design data, and the entity style data two or more additional variant images, wherein each of the additional variant images is generated by placing text items of the one or more text items in one or more of the one or more bounding boxes, generated for the seed image variant, based on the entity design data and wherein text of the text items is rendered using the entity style data.

15. The computer-implemented system of claim 14, wherein the processor generates the seed image variant by cropping the seed image such that an object of the seed image is not cropped out.

16. The computer-implemented system of claim 10, wherein the processor further generates additional sets of bounding boxes for the seed image by adjusting at least one edge of at least one of the one or more bounding boxes.

17. The computer-implemented system of claim 10, wherein the processor generates from the seed image, the entity design data, and the entity style data two or more variant images, by using the seed image, bounding boxes, entity style data, and one or more text items as input to a generative adversarial network.

18. The computer-implemented system of claim 10, wherein the entity design data comprises statistical data gathered from content associated with an entity from which the entity style data was gathered.

19. A system comprising: one or more computers and one or more storage devices storing instructions which are operable, when executed by the one or more computers, to cause the one or more computers to perform operations comprising:
- receiving a seed image, entity design data, entity style data, and one or more text items;
- generating for the seed image one or more bounding boxes that identify one or more areas of the seed image for the placement of the one or more text items;
- generating from the seed image, the entity design data, and the entity style data two or more variant images, wherein each of the variant images is generated by placing text items of the one or more text items and one or more items of iconography in one or more of the one or more bounding boxes, wherein a style of at least one of the one more or text items is based on a position of the at least one of the one or more text items and entity styles for text in different positions from the entity design data, positioning of at least one of the one or more text items relative to at least one of the one or more items of iconography is based on the entity design data and wherein text of the text items is rendered using the entity style data, and further comprising adjusting an image spectra of at least one of the one or more bounding boxes based on the image spectra of the one of the one more bounding boxes and a color of one of the one or more text items in the one of the one or more bounding boxes; and
- generating at least one additional bounding box for the seed image to cover an area between a boundary of one of the one or more bounding boxes and a horizontal or vertical edge of the seed image.

20. The system of claim 19, wherein the instructions further comprise instructions that cause the one or more computers to perform operations comprising:
- generating, from the seed image, a seed image variant;
- generating for the seed image variant one or more bounding boxes that identify one or more areas of the seed image variant for the placement of the one or more text items; and
- generating from the seed image variant, the entity design data, and the entity style data two or more additional variant images, wherein each of the additional variant images is generated by placing text items of the one or more text items in one or more of the one or more bounding boxes, generated for the seed image variant, based on the entity design data and wherein text of the text items is rendered using the entity style data.

* * * * *